J. POWELL.
COCK AND VALVE.
No. 192,658. Patented July 3, 1877.
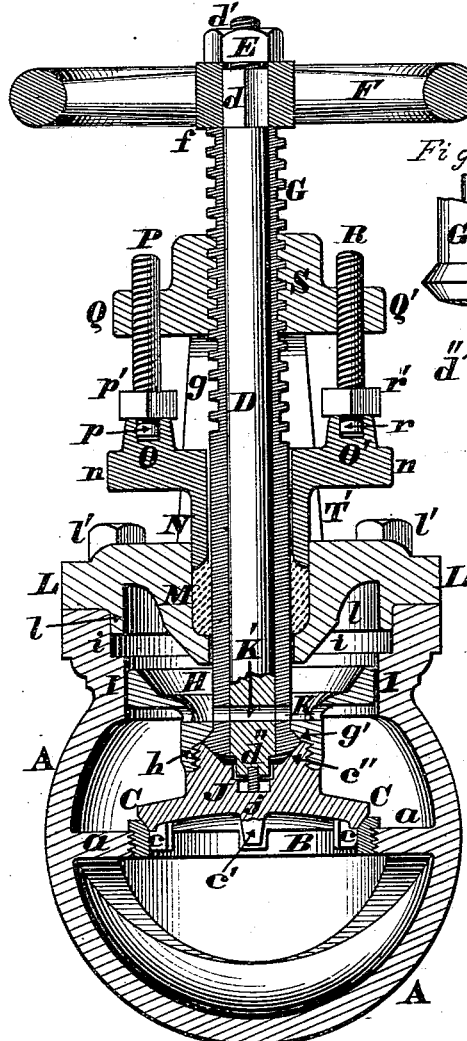
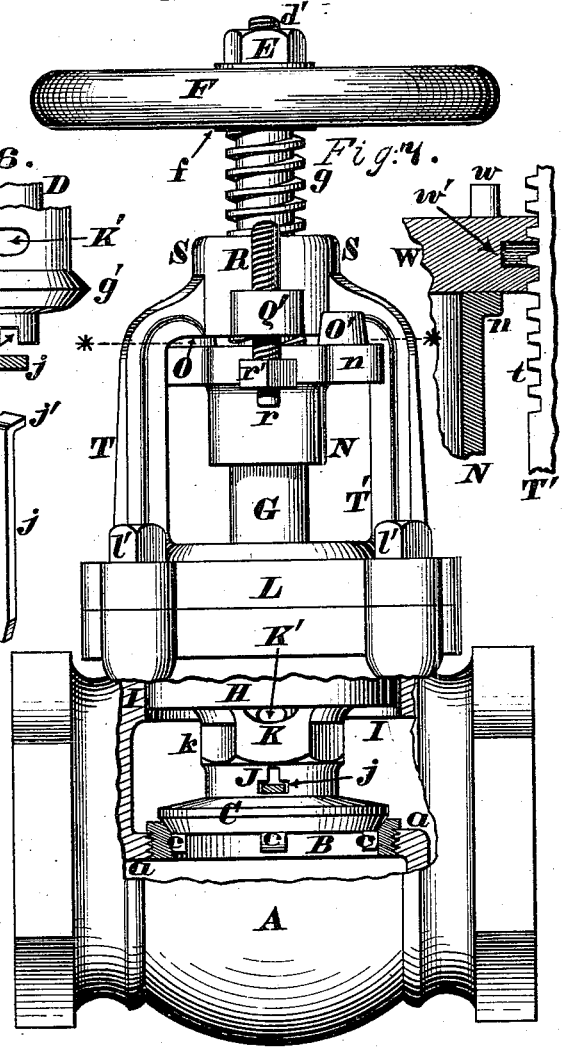
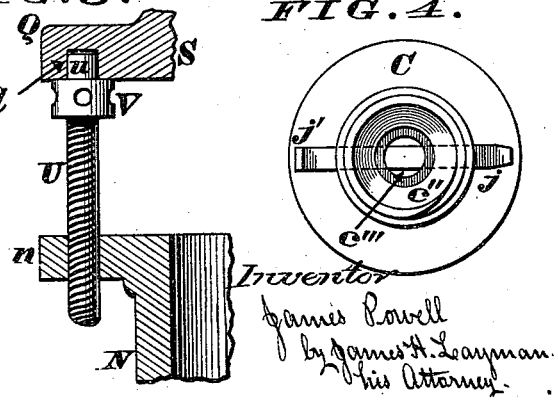

UNITED STATES PATENT OFFICE.

JAMES POWELL, OF CINCINNATI, OHIO.

IMPROVEMENT IN COCKS AND VALVES.

Specification forming part of Letters Patent No. 192,658, dated July 3, 1877; application filed April 12, 1877.

*To all whom it may concern:*

Be it known that I, JAMES POWELL, of Cincinnati, Hamilton county, Ohio, have invented certain new and useful Improvements in Cocks and Valves, of which the following is a specification:

This invention relates to that class of devices commonly known as globe valves or cocks, and the first of my improvements comprises a novel combination of appliances for adjusting the stuffing-box gland in order that any desired pressure may be brought to bear against the packing contained in said box, which latter is traversed by the customary valve-stem. Heretofore it has been customary to secure two vertical screws to the cap of the globe or shell, which screws, after passing through the perforated lugs or ears of the gland, have had nuts applied to their upper ends in order that the gland might be compressed against the packing by properly adjusting said nuts toward the valve-cap. One serious objection to this construction is that said screws are fixtures in the caps, and therefore they are constantly in the way when it is desired to fill the stuffing-box with packing, and owing to the limited space afforded around the stem this act of packing said box is attended with many inconveniences.

To overcome these annoyances I employ two or more screws in such a manner as to exercise a thrusting instead of a pulling action with reference to the gland, said screws being preferably engaged with suitable interiorly-threaded lugs or ears cast with or otherwise rigidly applied to the nutted portion of the yoke that guides the stem of the cock in a vertical path. The lower or unthreaded ends of these screws are stepped in suitable sockets or bearings in the upper surface of the gland, said screws having forged upon them collars or nuts, or else they are otherwise arranged to be readily rotated in either direction with a wrench or lever or other convenient implement. Now, by rotating these screws so as to force the gland away from the nutted portion of the yoke, the packing contained in the stuffing-box will be compressed accordingly; but when it is desired to pack said box, these screws are rotated in an opposite direction until their unthreaded stems disengage themselves from the sockets of the gland, after which act said gland may be turned aside to clear the screws, and the gland is then elevated by hand. This act leaves an ample and unobstructed space beneath the now elevated gland, and packing can then be inserted in the stuffing-box in the most convenient and effective manner, after which operation the gland is lowered and the compressing-screws are again brought into service.

The second part of my invention comprises a composite valve-stem, the axial member of which is a bar of iron or steel or other suitable hard metal, while the external shell thereof is composed of brass or other ductile and malleable alloy. This shell is cast around the axial bar or rod, and has the thread or operating-screw chased upon it, by which mode of construction the cost of the valve-stem is materially reduced, while at the same time its durability is increased.

The third part of my invention comprises the combination of a flat key or pin, and an inverted-T-shaped slot, whereby the loosely-coupled disk-valve may be rigidly united to the operating-stem when it is desired to regrind said valve, as hereinafter more fully explained.

In the annexed drawings, Figure 1 is a transverse section of a cock embodying my improvements, the gland being represented in its normal position, and the valve shown coupled to the operating-stem preparatory to regrinding. Fig. 2 is a longitudinal section of the cock, the valve being uncoupled from said stem, and the gland elevated to permit the stuffing-box being packed. Fig. 3 is a horizontal section at the line * *. Fig. 4 is a plan of the valve detached from its stem. Fig. 5 represents a modification of the gland-compressing devices. Diagrams 6 and 7 represent details of the invention.

A represents the globe or shell of a cock or valve or other device for controlling the flow of fluids of any kind, and B is the valve-seat, which seat may be made directly in the diaphragm *a* of said shell, or it may be a separate piece of metal screwed into, or otherwise secured to, the plate *a*.

Adapted to rest in the beveled counter-bore of this seat is a disk-valve, C, having a series of downwardly-projecting lugs or wings, *c*, which centralize said valve in its seat. Furthermore, this valve is furnished with a stump, $c'$, to receive a spanner or wrench when it is desired to uncouple said valve from the operating-stem, which latter device is constructed as follows: D represents an axial rod of iron or steel, or other hard metal, provided near its upper end with a non-circular portion, $d$, and a screw-threaded shank, $d'$, to which latter is applied nut E, said portion $d$ being inserted in the hub $f$ of hand-wheel F, as seen in Fig. 1; or this portion $d$ may be cylindrical, and have a groove to receive a key wherewith to lock the wheel F to stem D. The extreme lower end of this stem or rod is nicked or grooved at $d''$, as more clearly shown in Diagram 6.

Cast around this axial member D is an envelope or shell, G, preferably of brass, although it may be composed of any suitable alloy that will permit of a screw, $g$, being chased around it, which screw may be of any appropriate pitch.

The lower end of this shell has a ridge-shaped collar, $g'$, whose upper inclined surface or bearing supports a guide, H, that is adapted to have both a vertical and rotary movement within the cylindrical bore I of the valve's neck. This guide is provided with a diametrical opening, K, that may take the shape of a vertical slot passing through the annular curb or wall of said guide H. $h$ is a screw-thread wherewith said guide is coupled to the disk-valve C, the upper end of this valve being dished at $c''$ to serve as a seat or bearing for the lower portion of collar $g'$.

Furthermore, said valve C is pierced with a horizontal slot, J, whose transverse section has the shape of an inverted T, and said slot is adapted to retain, in either of two positions, a flat pin or tongue or key, $j$, having a flanged head, $j'$, as more clearly shown in Diagram 6.

When this pin is inserted in the vertical portion of slot J, and supported on its lower edge, the upper edge of said pin engages with the nick $d''$ of rod D, so as to compel the valve to rotate in unison with the stem when said disk C is to be reground into its seat B.

This coupled condition of the valve and stem is seen in Fig. 1.

To unlock the valve from the stem, the pin is withdrawn by grasping the head $j$, and then inserting said pin in the horizontal portion of slot J, as represented in Figs 2 and 4. Pin $j$ is now located a slight distance below the extremity of stem D, and, consequently, said pin is disengaged from the nick $d''$, as seen in Diagram 6. In this condition of the cock, valve C is loosely coupled to its operating-stem by the collar $g'$, guide H, and threaded joint $h$.

In case this key should be lost, the rotating guide H can be locked to the valve-stem by inserting a wire or nail, or other convenient appliance, through the openings K and $K'$ of the guide and stem, respectively; or the pin $j$ can be engaged in these openings in the event of slot J being rendered inoperative from any cause whatever. Cap L is maintained in its proper central position on the neck of the valve by an annular curb or flange, $l$ and bolts $l'$, said cap being chambered out at M to receive any suitable packing. Adapted to fit snugly within this chamber is an ordinary gland, N, having a flange or collar, $n$, which is preferably provided with two diametrically-opposite sockets or steps, O O', that receive the unthreaded stems $p\ r$ of screws P R, each screw being furnished, respectively, with a collar, $p'\ r'$, of any suitable shape. These collars are forged with or otherwise immovably secured to their respective screws, and rest upon the bearings O O', while the screws proper, P R, engage with laterally-projecting lugs Q Q' of the nut S of yoke T T', which yoke may be either cast with or bolted to valve-cap L.

To illustrate the method of adjusting the gland N, I will suppose that the various connections of the same are in the position shown in Fig. 1, and it is desired to compress more snugly around valve-stem D G the packing contained in chamber M.

To do this it is only necessary to apply a wrench or spanner to the squares or collars $p'\ r'$, and then rotate screws P R so as to compel gland N to recede from nut S, which movement of said gland compresses the packing accordingly, and thus prevents any leakage around the valve-stem.

To renew the packing in chamber M this operation is reversed, the screws P R being then turned so as to disengage their stems $p\ r$ from sockets O O'. Gland N is now rotated sufficiently, in either direction, to throw said sockets O O' out of line with the screws P R, after which said gland is withdrawn from chamber M and elevated until its flange $n$ comes in contact with nut S, in which elevated position the gland may be retained by hand. Or, if preferred, the elevated gland may be supported by engaging the collars $p'\ r'$ under flange $n$, as seen in Fig. 3, but in either case ample space will be afforded between the extremity of the elevated gland and cap L to permit the stuffing-box M being packed with the utmost facility, as access is had to the valve-stem from all sides, except only where the uprights T T' of the yoke are located.

As the leading feature of my invention consists in adjusting the gland N in such a manner as to dispense with fixed screws projecting from the valve-cap L, I reserve the right of modifying the details of construction, provided this feature is not departed from.

An obvious modification is seen in Fig. 5, where the unthreaded stem $u$ of screw U is shown seated in a socket, $q$, of lug Q, while the threaded portion of said screw engages with the gland-flange.

The square is omitted from the screw, as the latter is rotated, by inserting a lever or pry in either of the apertures of the capstan-head V.

Another modification is seen in Diagram 7, which shows the gland-flange $n$ in contact with a rotating nut or disk, W, whose periphery is threaded to engage with a segment-screw, $t$, cut upon the inner ribs of yoke T T', said disk being provided either with lugs $w$ or radial sockets $w'$. These lugs or sockets permit said disk being rotated in either direction, so as to force the gland down or allow it to be elevated, it being understood that the segment-screw $t$ is cut upon the two opposing faces or ribs of yoke T T'.

Or the flange $n$ may be threaded to engage directly with the segmental screws $t$ of yoke T T', in which case a loose ring or washer should be interposed between the lower end of gland N and the packing in chamber M, to prevent said packing being twisted or torn by the rotation of the gland when the latter is screwed home.

Furthermore, I do not limit my improved gland-adjusting devices to valves or cocks, but I intend to apply this improvement to any stuffing-box where two or more complete or segmental screws can be caused to exercise a thrusting instead of a pulling action against the gland.

It is to be understood that the bolts $l'$ are first unscrewed from cap L, preparatory to re-grinding valve C, which operation is then performed in the usual manner after said valve has been properly locked to the stem D $d''$, the annular flange $l'$ serving to maintain said cap and its attached yoke T T' in their axial position with reference to the neck I.

The composite valve-stem is an important improvement in cocks and valves, as a non-corrosive stem is thereby produced without making it wholly of brass or other expensive metal. In addition to this advantage, the iron or steel, or other tough core or mandrel D, renders said stem more rigid and reliable than it would be if composed entirely of brass or other alloy.

I prefer making the aperture or slot K of valve nut or guide H somewhat larger than the perforation K' of controlling-stem D, in order tthat valve C may oscillate freely upon said stem, so as to insure the ready adjustment of said valve upon its bearing or seat in the diaphragm $a$. But it is evident this arrangement may be exactly reversed—that is to say, the aperture K' may be made larger than the slot K.

I am aware that it is not new to couple the valve nut or guide to the operating-stem with a screw-pin when the valve is to be re-ground, as several modifications of such coupling devices are seen in Letters Patent No. 61,758 and No. 77,913, issued to me, respectively, February 5, 1867, and May 12, 1868.

In the present invention, however, I dispense with a special screw-pin, and enable the guide and stem being coupled together, for re-grinding, with a nail or wire, or other temporary appliance.

Furthermore, the present invention facilitates the manufacture of cocks and valves, as the slots can be cast in the walls of the guide or valve-nut H. This expedient leaves but a single hole to be drilled, which hole is made in stem D previous to the cock being finished, thus dispensing with the accurate fitting that is necessary when the guide and stem are coupled together and then drilled.

I claim as my invention—

1. A stuffing-box whose gland is compressed against the packing by two or more screws or segmental screws interposed between said gland and suitable abutment, in such a manner as to exercise a thrusting action against the gland, substantially as herein described, and for the purpose set forth.

2. The combination of stuffing-box M, gland N $n$, sockets O O', screws P $p$ $p'$ R $r$ $r''$, and threaded abutments Q Q', substantially as herein described, and for the purpose set forth.

3. The combination, in a valve or cock, of screw-threaded stem G $g$, cap L, stuffing-box M, gland N $n$, sockets O O', screws P $p$ $p'$ R $r$ $r'$, abutments Q Q', nut S, and yoke T T', substantially as herein described, and for the purpose set forth.

4. A composite valve-stem consisting of an axial rod, D, of hard metal, with an envelope, G, of fusible metal or alloy cast around it, said envelope being provided with an operating screw-thread, $g$, substantially as herein described, and for the purpose set forth.

5. A valve-stem consisting of an axial rod, D, of hard metal, and a surrounding envelope, G $g$, of fusible metal, the upper end of said rod being threaded at $d'$ for retaining hand-wheel F, while the lower end of the envelope is furnished with a collar, $g'$, for supporting the valve and its attachments, substantially as herein described, and for the purpose set forth.

6. The combination, in a valve or cock, of the nicked stem $d''$, loosely-coupled valve C, inverted T-shaped slot J, and removable pin $j$, which latter is capable of insertion in said slot, either vertically or horizontally, substantially as herein described, and for the purpose set forth.

7. The combination, in a cock or valve, of perforated stem D K' and perforated valve-nut or guide H K, when one of said perforations is of relatively greater size than the other one, substantially as herein described, and for the purpose set forth.

In testimony of which invention I hereunto set my hand.

JAMES POWELL.

Witnesses:
JAMES H. LAYMAN,
D. P. KENNEDY.